(12) United States Patent
Nakase

(10) Patent No.: US 7,657,637 B2
(45) Date of Patent: Feb. 2, 2010

(54) CLIENT SERVER SYSTEM FOR TRANSMITTING REGULAR CONNECTION INFORMATION VIA WIRELESS NETWORK TO CLIENT BASED ON TEMPORARY CONNECTION INFORMATION RECEIVED FROM WIRED NETWORK

(75) Inventor: Takafumi Nakase, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 430 days.

(21) Appl. No.: 11/754,634

(22) Filed: May 29, 2007

(65) Prior Publication Data

US 2007/0276906 A1 Nov. 29, 2007

(30) Foreign Application Priority Data

May 29, 2006 (JP) ............................. 2006-148470

(51) Int. Cl.
*G06F 15/16* (2006.01)
(52) U.S. Cl. .................. 709/228; 709/227; 709/220; 709/221
(58) Field of Classification Search ................ 709/227, 709/228, 229, 223, 203, 220, 221, 222, 204, 709/224; 370/252; 455/501
See application file for complete search history.

(56) References Cited

U.S. PATENT DOCUMENTS

| | | | | |
|---|---|---|---|---|
| 2001/0054097 | A1* | 12/2001 | Chafe | 709/224 |
| 2003/0105812 | A1* | 6/2003 | Flowers et al. | 709/203 |
| 2003/0182431 | A1* | 9/2003 | Sturniolo et al. | 709/227 |
| 2005/0193127 | A1* | 9/2005 | Moore et al. | 709/228 |
| 2005/0273513 | A1* | 12/2005 | Panasyuk et al. | 709/228 |
| 2006/0183490 | A1* | 8/2006 | Madhavan et al. | 455/501 |
| 2007/0088780 | A1* | 4/2007 | Sato et al. | 709/204 |
| 2007/0104112 | A1* | 5/2007 | Sayers et al. | 370/252 |
| 2009/0019141 | A1* | 1/2009 | Bush et al. | 709/223 |

FOREIGN PATENT DOCUMENTS

| | | |
|---|---|---|
| JP | 2001-36638 A | 2/2001 |
| JP | 2005-80150 A | 3/2005 |

* cited by examiner

*Primary Examiner*—Le Luu
(74) *Attorney, Agent, or Firm*—Crowell & Moring LLP

(57) ABSTRACT

A client server system includes a server apparatus, and a client terminal apparatus connecting with the server apparatus via a wireless network based on regular connection information, and the client terminal apparatus includes a storage unit to store the regular connection information, a wired transmission unit to transmit temporary connection information to the server apparatus by a wired transmission at a predetermined timing, a wireless receiving unit to receive the regular connection information which is transmitted from the server apparatus based on the temporary connection information via the wireless network, and a storage control unit to store the regular connection information in the storage unit, and the server apparatus includes a wired receiving unit to receive the temporary connection information, and a wireless transmission unit to transmit the regular connection information to the client terminal apparatus, by using the temporary connection information via the wireless network.

5 Claims, 2 Drawing Sheets

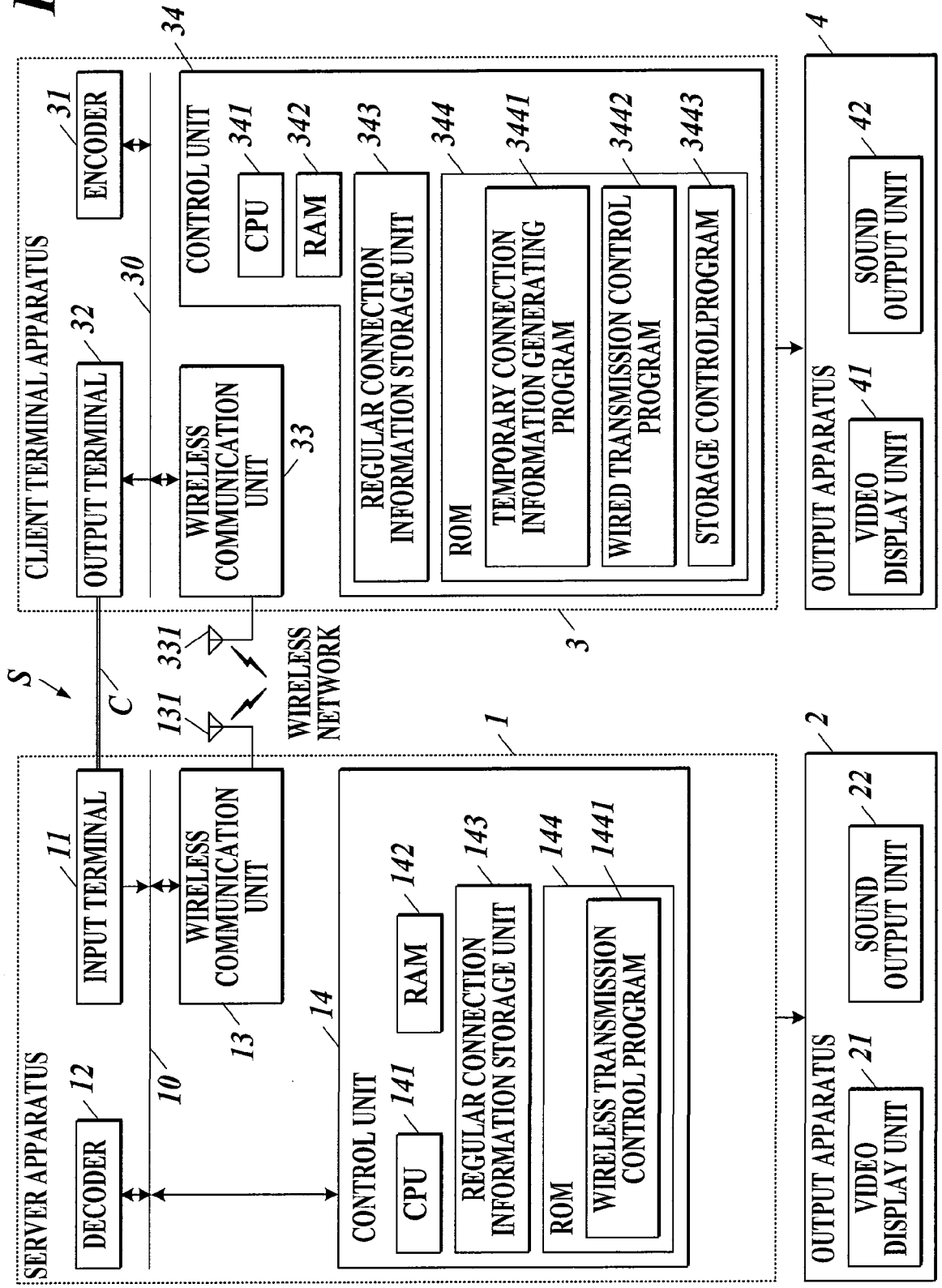

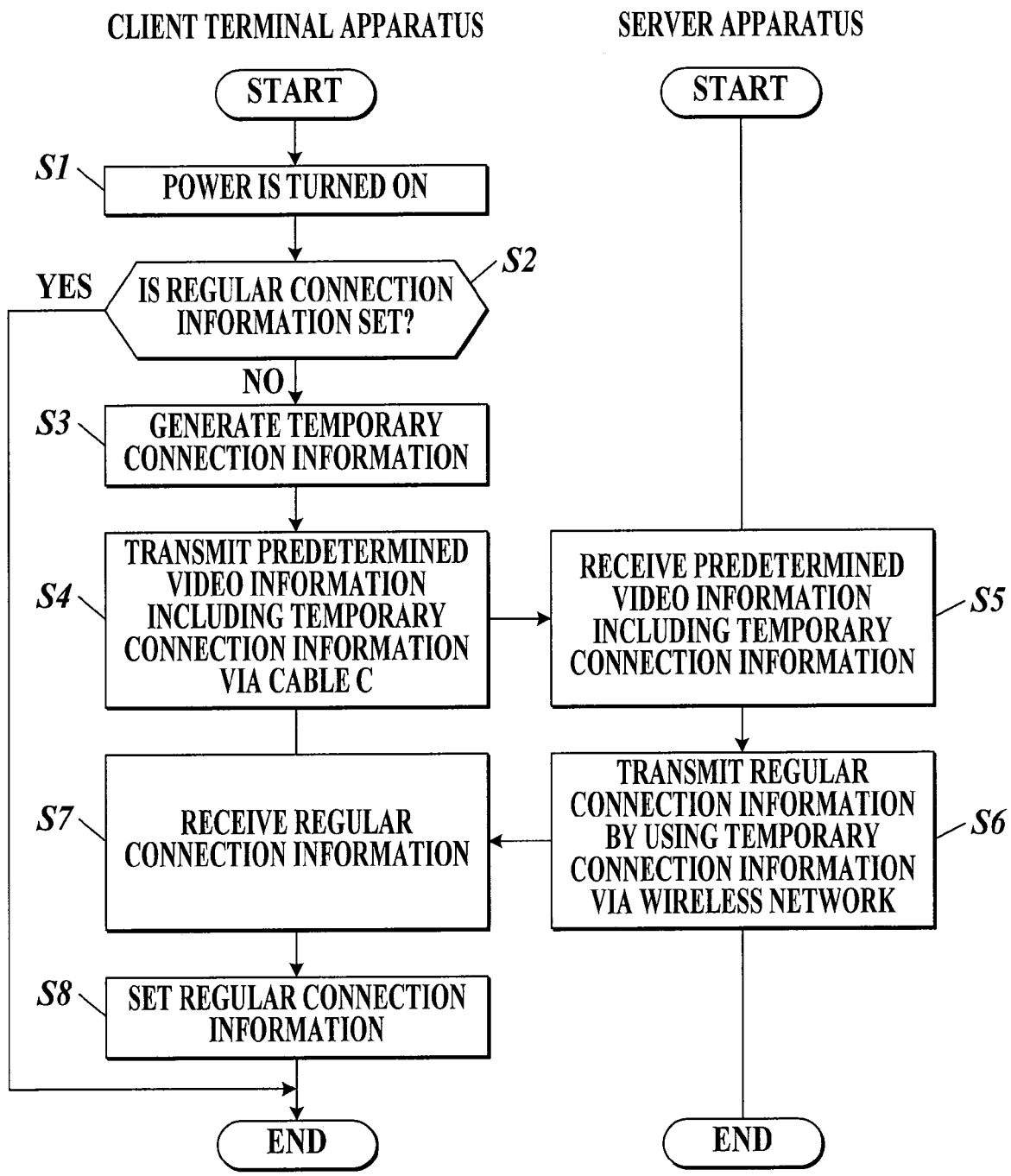

CLIENT SERVER SYSTEM FOR TRANSMITTING REGULAR CONNECTION INFORMATION VIA WIRELESS NETWORK TO CLIENT BASED ON TEMPORARY CONNECTION INFORMATION RECEIVED FROM WIRED NETWORK

BACKGROUND OF THE INVENTION

1. Field of the Invention

The present invention relates to a client server system.

2. Description of the Related Art

A client server system which comprises a server apparatus and a client terminal apparatus connected with the server apparatus via a wireless network is known.

In the above mentioned client server system, in order to carry out a wireless communication between the server apparatus and the client terminal apparatus, connection information which includes an identifier to discriminate the wireless network, an encryption key to encode/decode communication data, and the like needs to be shared between the server apparatus and the client terminal apparatus from a viewpoint of security and the like.

Further, for example, in order to transmit the identical contents to a plurality of client terminal apparatuses from the server apparatus at the same time, the identical connection information need to be shared between the server apparatus and the plurality of client terminal apparatuses. Therefore, when a new client terminal apparatus connects to the server apparatus, the connection information which is shared between the server apparatus and the plurality of client terminal apparatuses needs to be set in the new client terminal apparatus.

Conventionally, setting of the connection information is, for example, manually input by a user. Therefore, the setting of the connection information has a problem that the setting is troublesome and cannot be carried out in an apparatus which does not have an input unit such as key board and the like.

Consequently, for example, a communication apparatus which can obtain contents information relating to the contents (information relating to length, playing time, and the like of the contents) from the contents storage medium (device such as CD, DVD, or the like) in which the contents are stored, can calculate the connection information from the contents information, and can set the calculated connection information is suggested (for example, see JP2005-80150A).

Further, an apparatus which can generate and set the connection information based on the information such as the number of times of pushing a push button, the timing of pushing a push button, and the like is suggested (for example, see JP2001-36638A).

However, in the case disclosed in JP2005-80150A, there is a problem that the communication apparatus cannot be applied to an apparatus to which the contents storage medium cannot be attached.

Moreover, in the case disclosed in JP2001-36638A, there is a problem that a user can be bothered because the number of times of pushing the push button or the timing of pushing the push button needs to be measured.

SUMMARY OF THE INVENTION

An object of the present invention is to provide a client server system which can easily set regular connection information which is needed to carry out a wireless communication with a server apparatus in an arbitrary client terminal apparatus.

To solve the above problem, in accordance with a first aspect of the present invention, a client server system, comprises a server apparatus, and a client terminal apparatus connecting with the server apparatus via a wireless network based on regular connection information, and the client terminal apparatus comprises a storage unit to store the regular connection information, a wired transmission unit to transmit temporary connection information to the server apparatus by a wired transmission at a predetermined timing when the regular connection information is not stored in the storage unit, a wireless receiving unit to receive the regular connection information which is transmitted from the server apparatus connected with the client terminal apparatus based on the temporary connection information via the wireless network, and a storage control unit to store the regular connection information which is received by the wireless receiving unit in the storage unit, and the server apparatus comprises a wired receiving unit to receive the temporary connection information which is transmitted by the wired transmission unit, and a wireless transmission unit to transmit the regular connection information to the client terminal apparatus by which the temporary connection information is transmitted, by using the temporary connection information received by the wired receiving unit via the wireless network.

According to the first aspect of the present invention, the client terminal apparatus can store the regular connection information by the storage unit, can transmit the temporary connection information to the server apparatus by a wired transmission at a predetermined timing by the wired transmission unit when the regular connection information is not stored in the storage unit, can receive the regular connection information which is transmitted from the server apparatus connected with the client terminal apparatus based on the temporary connection information via a wireless network by the wireless receiving unit, and can store the regular connection information which is received by the wireless receiving unit in the storage unit by the storage control unit. Further, the server apparatus can receive the temporary connection information which is transmitted by the wired transmission unit by the wired receiving unit, and can transmit the regular connection information to the client terminal apparatus by which the temporary connection information is transmitted by using the temporary connection information received by the wired receiving unit by the wireless transmission unit via the wireless network.

That is, the client terminal apparatus can set the regular connection information by merely being connected with the server apparatus by a wired connection. Thus, the regular connection information needed for carrying out a wireless communication with the server apparatus can be set easily in an arbitrary client terminal apparatus.

Further, because the client terminal apparatus executes the process for setting the regular connection information only when the regular connection information is not set, the regular connection information is efficiently set.

In accordance with a second aspect of the present invention, a client server system comprises a server apparatus, and a client terminal apparatus connecting with the server apparatus via a wireless network based on regular connection information, and the client terminal apparatus comprises a storage unit to store the regular connection information, a wired transmission unit to transmit temporary connection information to the server apparatus by a wired transmission at a predetermined timing, a wireless receiving unit to receive the regular connection information which is transmitted from the server apparatus connected with the client terminal apparatus based on the temporary connection information via the wireless network, and a storage control unit to store the regular connection information which is received by the wireless receiving unit in the storage unit, and the server apparatus comprises a wired receiving unit to receive the temporary connection information which is transmitted by the wired transmission unit, and a wireless transmission unit to transmit the regular connection information to the client terminal apparatus by which the temporary connection information is transmitted, by using the temporary connection information received by the wired receiving unit via the wireless network.

According to the second aspect of the present invention, the client terminal apparatus can store the regular connection information by the storage unit, can transmit the temporary connection information to the server apparatus with a wired transmission by the wired transmission unit at a predetermined timing, can receive the regular connection information which is transmitted from the server apparatus which is connected with the client terminal apparatus based on the temporary connection information via the wireless network by the wireless receiving unit, and can store the regular connection information which is received by the wireless receiving unit in the storage unit by the storage control unit. Further, the server apparatus can receive the temporary connection information which is transmitted from the wired transmission unit by the wired receiving unit, and can transmit the regular connection information to the client terminal apparatus by which the temporary connection information is transmitted by using the temporary connection information received by the wired receiving unit via the wireless network by the wireless transmission unit.

That is, the client terminal apparatus can set the regular connection information by merely being connected with the server apparatus by a wired connection. Therefore, the regular connection information needed for carrying out a wireless communication with the server apparatus can be set easily in an arbitrary client terminal apparatus.

Preferably, the wired transmission unit transmits the temporary connection information to the server apparatus by the wired transmission when the regular connection information is not stored in the storage unit.

In the present invention, the same effect is obtained. Further, the client terminal apparatus can transmit the temporary connection information to the server apparatus with a wired transmission by the wired transmission unit when the regular connection information is not stored in the storage unit.

That is, because the client terminal apparatus executes the process for setting the regular connection information only when the regular connection information is not set, the regular connection information is efficiently set.

Preferably, the temporary connection information is included in a Vertical Blanking Interval.

In the present invention, the same effect is obtained. Further, the temporary connection information is included in the VBI (Vertical Blanking Interval).

Therefore, because the temporary connection information can be included in the existing transmission information, it is highly convenient.

BRIEF DESCRIPTION OF THE DRAWINGS

The present invention will be fully understood from the detailed description given hereinafter and the accompanying drawings given by way of illustration only, and thus are not intended as a definition of the limits of the present invention, wherein:

FIG. 1 is a block diagram showing a construction of a client server system according to the present invention; and FIG. 2 is a flowchart for explaining a process relating to a setting of regular connection information to a client terminal apparatus by a client server system according in the present invention.

PREFERRED EMBODIMENT OF THE INVENTION

Hereinafter, a preferred embodiment of a client server system according to the present invention will be described in detail with reference to drawings. However, the scope of the present invention is not limited to the example shown in the drawings.

<Construction of a Client Server System>

First, the construction of a client server system S will be described with reference to FIG. 1.

The client server system S comprises, for example, a server apparatus 1 and a client terminal apparatus 3 which connects with the server apparatus 1 based on the regular connection information via a wireless network.

Here, the wireless network is, for example, a network such as a wireless LAN which complies with the IEEE (Institute of Electrical and Electronic Engineers) 802.11 standard or the like.

Particularly, in the client server system S, for example, contents (video information and sound information) are to be transmitted from the server apparatus 1 to the client terminal apparatus 3 by the wireless communication based on the regular connection information.

More particularly, the server apparatus 1, for example, has a function to obtain the contents from a television broadcast wave and a function to replay the contents which are recorded in a recording medium. Further, the server apparatus 1, for example, transmits the obtained contents and the replayed contents to the client terminal apparatus 3 which is connected to the server apparatus 1 based on the regular connection information via the wireless network. Then, the transmitted contents are output by an output apparatus 4 which is connected with the client terminal apparatus 3, and are to be viewed by a user of the client server system S.

That is, when the identical regular connection information is set, the server apparatus 1 and the client terminal apparatus 3 are regularly connected based on the regular connection information, and communication data such as the contents and the like can be sent and received by a wireless transmission.

Here, the regular connection information includes, for example, an identifier to discriminate the wireless network, which has a predetermined value (for example, the SSID (Server Set Identifier) or the like), and an encryption key to encode/decode the communication data, which has a predetermined value.

Further, the contents which are obtained or replayed by the server apparatus 1 are output by an output apparatus 2 which connects with the server apparatus 1, and are viewed by a user of the client server system S.

The server apparatus 1 and the client terminal apparatus 3, for example, can be connected based on the temporary connection information via the wireless network.

Particularly, in the client server system S, for example, the regular connection information is to be transmitted from the server apparatus 1 to the client terminal apparatus 3 by the wireless communication based on the temporary connection information.

More particularly, for example, the regular connection information is set in the server apparatus 1 in advance, and for example, the server apparatus 1 transmits the set regular connection information to the client terminal apparatus 3 connected with the server apparatus 1 based on the temporary connection information via the wireless network.

That is, when the server apparatus 1 and the client terminal apparatus 3 recognize the identical temporary connection information, they are temporarily connected based on the temporary connection information, and the regular connection information can be transmitted from the server apparatus 1 to the client terminal apparatus 3 by a wireless transmission. When the regular connection information is transmitted in such way, the connection information which is identical to the regular connection information set in the server apparatus 1 is to be set in the client terminal apparatus 3.

Here, the temporary connection information includes, for example, an identifier having a given value, an encryption key having a given value, and the like.

Further, the server apparatus 1 and the client terminal apparatus 3, for example, can be connected with a cable C as a wired connection.

Particularly, in the client server system S, for example, predetermined video information is to be transmitted from the client terminal apparatus 3 to the server apparatus 1 by the communication via the cable C. The predetermined video information which is to be transmitted includes the temporary connection information, for example.

More particularly, for example, the predetermined video information is stored in the client terminal apparatus 3 in advance, and the client terminal apparatus 3, for example, transmits the stored predetermined video information to the server apparatus 1 connected with the client terminal apparatus 3 via the cable C.

Moreover, for example, the client terminal apparatus 3 can generate the temporary connection information, and for example, when the temporary connection information is generated, the client terminal apparatus 3 makes the temporary connection information be included in the predetermined video information which is to be transmitted to the server apparatus 1 to transmit the information via the cable C.

(Client Terminal Apparatus)

The client terminal apparatus 3 comprises, for example, an encoder 31, an output terminal 32, a wireless communication unit 33, a control unit 34, and the like as shown in FIG. 1. Each unit is connected with a bus 30.

Further, the client terminal apparatus 3, for example, is connected with the output apparatus 4 which includes a video display unit 41, a sound output unit 42, and the like.

In compliance with a control signal which is input from the control unit 34, the encoder 31, for example, encodes the predetermined video information which is stored in the client terminal apparatus 3 in advance or the predetermined video information in which the temporary connection information is included in a predetermined file format (for example, the MPEG-2 (Moving Picture Experts Group phase 2) format or the like).

In compliance with a control signal which is input from the control unit 34, the output terminal 32, for example, outputs the predetermined video information which is encoded by the encoder 31 to the input terminal 11 (after-mentioned) of the server apparatus 1 via the cable C.

Particularly, in compliance with a control signal which is input from the control unit 34, for example, as a part of a wired transmission unit, the output terminal 32 transmits the predetermined video information including the temporary connection information to the server apparatus 1 by the cable C at a predetermined timing in case where the regular connection information is not stored in a regular connection information storage unit 343 (after-mentioned).

The wireless communication unit 33, for example, carries out a wireless communication with the server apparatus 1 via the wireless network.

Particularly, the wireless communication unit 33 comprises, for example, an antenna 331 to carry out sending and receiving of the communication data with the server apparatus 1, a RF (Radio Frequency) converter (omitted from the drawing), a wireless LAN card (omitted from the drawing) to connect with a wireless LAN which complies with the IEEE802.11 standard or the like, and the like.

More particularly, the wireless communication unit 33, for example, receives the regular connection information which is transmitted from the server apparatus 1 connected with the wireless communication unit 33 based on the temporary connection information via the wireless network as a wireless receiving unit.

Further, the wireless communication unit 33, for example, receives the communication data such as the contents and the like which are transmitted from the server apparatus 1 connected with the wireless communication unit 33 based on the regular connection information via the wireless network. Then, the received contents, for example, are decoded by the decoder (omitted from the drawing) which is provided in the client terminal apparatus 3, and are to be output to the output apparatus 4.

The video display unit 41 which is included in the output apparatus 4, for example, is liquid crystal display equipment or the like, and for example, displays the videos based on the video information included in the contents which are received by the wireless communication unit 33.

Moreover, the sound output unit 42 which is included in the output apparatus 4, for example, is speaker equipment or the like, and for example, outputs the sounds based on the sound information included in the contents which are received by the wireless communication unit 33.

The control unit 34 comprises, for example, a CPU (Central Processing Unit) 341, a RAM (Random Access Memory) 342, a regular connection information storage unit 343, a ROM 344, and the like as shown in FIG. 1.

The CPU 341 carries out various types of controlling operations in compliance with various types of processing programs for the client terminal apparatus 3, which are stored in the ROM 344.

The RAM 342 comprises a program storage area for expanding the processing programs and the like which are executed by the CPU 341, a data storage area for storing the input data and the processing results which are caused when the above mentioned processing programs are executed, and the like.

The regular connection information storage unit 343 comprises, for example, a non-volatile memory such as the EPROM (Erasable Programmable ROM) or the like, and the regular connection information storage unit 343 stores the regular connection information which is received by the wireless communication unit 33 as a storage unit.

The ROM 344 stores a system program which can be executed in the client terminal apparatus 3, various types of processing programs which can be executed by the system program, data which is used when the various types of processing programs are executed, data of processing results which are caused by arithmetically processing the data by the CPU 341, and the like. Here, the programs are stored in the ROM 344 in the form of program codes which can be read by a computer.

Particularly, the ROM 344 stores, for example, a temporary connection information generating program 3441, a wired transmission control program 3442, a storage control program 3443, and the like as shown in FIG. 1.

Further, the ROM 344 stores the predetermined video information and the like, for example.

For example, when the regular connection information is not set in the client terminal apparatus 3, that is, in case where the regular connection information is not stored in the regular connection information storage unit 343, the temporary connection information generating program 3441 allows the CPU 341 to realize the function of generating the temporary connection information which includes the identifier having a given value, the encryption key having a given value, and the like at a predetermined timing.

Particularly, the predetermined timing is, for example, immediately after the power of the client terminal apparatus 3 is turned on.

The wired transmission control program 3442, for example, allows the decoder (omitted from the drawing) to decode the predetermined video information which is stored in the ROM 344 and allows the encoder 31 to encode the decoded predetermined video information at a predetermined timing. Then, the wired transmission control program 3442 inputs a control signal to the output terminal 32 and allows the CPU 341 to realize the function of transmitting the encoded predetermined video information to the server apparatus 1 by the cable C.

Here, for example, when the regular connection information is not stored in the regular connection information storage unit 343, that is, in case where the temporary connection information is generated by the CPU 341 which has executed the temporary connection information generating program 3441, the CPU 341 makes the generated predetermined connection information be included in the predetermined video information which is decoded by the decoder (omitted from the drawing) and makes the encoder 31 encode the predetermined video information including the temporary connection information to transmit the information to the server apparatus 1.

Particularly, the predetermined timing, for example, is immediately after the power of the client terminal apparatus 3 is turned on.

Moreover, the CPU 341, for example, makes the temporary connection information be included in the closed caption among the VBI (Vertical Blanking Interval) included in the predetermined video information.

The CPU 341 functions as a wired transmission unit along with the output terminal 32 by executing the wired transmission control program 3442.

The storage control program 3443, for example, allows the CPU 341 to realize a function of storing the regular connection information which is received by the wireless communication unit 33 in the regular connection information storage unit 343, that is, a function of setting the regular connection information in the client terminal apparatus 3.

The CPU 341 functions as a storage control unit by executing the storage control program 3443.

(Server Apparatus)

The server apparatus 1 comprises, for example, an input terminal 11, a decoder 12, a wireless communication unit 13, a control unit 14, and the like as shown in FIG. 1. Each unit is connected by a bus 10.

Further, for example, the server apparatus 1 is connected with an output apparatus 2 which includes a video display unit 21, a sound output unit 22, and the like.

For example, the predetermined video information which is output from the output terminal 32 of the client terminal apparatus 3 is input to the input terminal 11 via the cable C.

Particularly, as a wired receiving unit, the input terminal 11, for example, receives the predetermined video information which includes the temporary connection information which is transmitted by the output terminal 32.

In compliance with a control signal which is input from the control unit 14, the decoder 12, for example, decodes the predetermined video information which is input to the input terminal 11 and outputs the decoded predetermined video information to the output apparatus 4.

Moreover, the decoder 12, for example, decodes the input predetermined video information and divides the temporary connection information from the decoded predetermined video information when the temporary connection information is included in the predetermined video information input to the input terminal 11. Then, the decoder 12 outputs the decoded predetermined video information to the output apparatus 4 and outputs the divided temporary connection information to the control unit 14.

The video display unit 21 included in the output apparatus 2 is, for example, liquid display equipment or the like, and for example, displays the videos based on the predetermined video information which is decoded by the decoder 12.

Here, when the temporary connection information is included in the predetermined video information, a character string or the like based on the temporary connection information is displayed on the video display unit 21. However, this character string or the like is meaningless and there is no effect on the visibility of the video.

Further, the sound output unit 22 included in the output apparatus 2 is, for example, speaker equipment or the like.

The wireless communication unit 13, for example, carries out a wireless communication with the client terminal apparatus 3 via the wireless network.

Particularly, the wireless communication unit 13, for example, comprises an antenna 131 to carry out sending and receiving of the communication data with the client terminal apparatus 3, a RF (Radio Frequency) converter (omitted from the drawing), a wireless LAN card to connect to the wireless LAN which complies with the IEEE802.11 standard or the like (omitted from the drawing), and the like.

More particularly, the wireless communication unit 13, for example, connects with the wireless communication unit 33 of the client terminal apparatus 3 by which the temporary connection information is transmitted by using the temporary connection information which is received by the input terminal 11 as a part of the wireless transmission unit in compliance with a control signal which is input from the control unit 14. Then, the wireless communication unit 13 transmits the regular connection information to the wireless communication unit 33 of the client terminal apparatus 3 which is connected with the wireless communication unit 13 based on the temporary connection information via the wireless network.

Further, in compliance with a control signal which is input from the control unit 14, the wireless communication unit 13, for example, transmits the communication data such as the contents and the like to the client terminal apparatus 3 which is connected with the wireless communication unit 13 based on the regular connection information via the wireless network.

The control unit 14 comprises, for example, a CPU 141, a RAM 142, a regular connection information storage unit 143, a ROM 144, and the like as shown in FIG. 1.

The CPU 141 carries out various types of controlling operations in compliance with various types of processing programs for the server apparatus 1 which are stored in the ROM 144.

The RAM 142 comprises a program storage area for expanding the processing programs and the like which are executed by the CPU 141, a data storage area for storing the input data and the processing results which are caused when the above mentioned processing programs are executed, and the like.

The regular connection information storage unit 143 comprises, for example, a non-volatile memory such as the EPROM (Erasable Programmable ROM) or the like, and the regular connection information is stored therein in advance. That is, the regular connection information is set in the server apparatus 1 in advance.

The ROM 144 stores a system program which can be executed in the server apparatus 1, various types of processing programs which can be executed in the system program, data which is used when the various types of processing programs are executed, and data of processing results which are caused by arithmetically processing the data by the CPU 141. Here, programs are stored in the ROM 144 in the form of program codes which can be read by a computer.

Particularly, for example, the ROM 144 stores the wireless transmission control program 1441 and the like as shown in FIG. 1.

The wireless transmission control program 1441, for example, inputs a control signal to the wireless communication unit 13 and connects with the wireless communication unit 33 of the client terminal apparatus 3 by which the temporary connection information is transmitted by using the temporary connection information received by the input terminal 11. Then, the wireless transmission control program 1441 allows the CPU 141 to realize the function of transmitting the regular connection information which is stored in the regular connection information storage unit 143 to the wireless communication unit 33 of the client terminal apparatus 3 which is connected based on the temporary connection information via the wireless network.

The CPU 141 functions as a wireless transmission unit along with the wireless communication unit 13 by executing the wireless transmission control program 1441.

<Regular Connection Information Setting Process>

Next, a description will be given for a process relating to the setting of the regular connection information in the client terminal apparatus 3 by the client server system S according to the present invention with reference to the flowchart in FIG. 2.

First, when the power of the client terminal apparatus 3 is turned on (step S1), the CPU 341 of the client terminal apparatus 3 executes the temporary connection information generating program 3441, and determines whether the regular connection information is stored in the regular connection information storage unit 343 or not, that is, whether the regular connection information is set in the client terminal apparatus 3 is determined (step S2).

When it is determined that the regular connection information is set in the client terminal apparatus 3 in step S2 (step S2; Yes), the CPU 341 executes the wired transmission control program 3442, inputs a control signal to the output terminal 32, transmits the predetermined video information which is stored in the client terminal apparatus 3 in advance to the server apparatus 1 via the cable C, and finishes the process.

When it is determined that the regular connection information is not set in the client terminal apparatus 3 in step S2 (step S2; No), the CPU 341 generates the temporary connection information (step S3).

Next, the CPU 341 executes the wired transmission control program 3442, and makes the temporary connection information generated in step S3 be included in the predetermined video information which is stored in the client terminal apparatus 3 in advance. Then, the CPU 341 inputs a control signal to the output terminal 32 and transmits the predetermined video information which includes the temporary connection information to the server apparatus 1 via the cable C (step S4).

When the input terminal 11 of the server apparatus 1 receives the predetermined video information including the temporary connection information which is transmitted in step S4 (step S5), the CPU 141 of the server apparatus 1 executes the wireless transmission control program 1441, inputs a control signal to the wireless communication unit 13. Then, by using the temporary connection information which is received in step S5, the CPU 141 transmits the regular connection information via the wireless network, which is stored in the regular connection information storage unit 143 to the client terminal apparatus 3 by which the temporary connection information is transmitted (step S6).

When the output terminal 32 of the client terminal apparatus 3 receives the regular connection information which is transmitted in step S6 (step S7), the CPU 341 of the client terminal apparatus 3 executes the storage control program 3443 and stores the regular connection information which is received in step S7 in the regular connection information storage unit 343, that is, the CPU 341 sets the regular connection information in the client terminal apparatus 3 (step S8). Then, the CPU 341 finishes the process.

In accordance with the client server system S according to the present invention described above, that is, a client server system S comprising the server apparatus 1 and the client terminal apparatus 3 which connects with the server apparatus 1 via the wireless network based on the regular connection information, the client terminal apparatus 3 can store the regular connection information by the regular connection information storage unit 343, can transmit the temporary connection information to the server apparatus 1 via the cable C by the output terminal 32 and the CPU 342 which has executed the wired transmission control program 3442 at a predetermined timing (for example, immediately after the power of the client terminal apparatus 3 is turned on), can receive the regular connection information which is transmitted from the server apparatus 1 connected with the client terminal apparatus 3 based on the temporary connection information by the wireless communication unit 33 via the wireless network, can store the regular connection information which is received by the wireless communication unit 33 in the regular connection information storage unit 343 by the CPU 341 which has executed the storage control program 3443. Further, the server apparatus 1 can receive the temporary connection information transmitted by the output terminal 32 and the CPU 342 which has executed the wired transmission control program 3442 by the input terminal 11, and can transmit the regular connection information via the wireless network to the client terminal apparatus 3 by which the temporary connection information is transmitted by using the temporary connection information received by the input terminal 11 by the wireless communication unit 13 and the CPU 141 which has executed the wireless transmission control program 1441.

That is, the client terminal apparatus 3 can set the regular connection information merely by being connected with the server 1 by the cable C. Therefore, the regular connection information needed to carry out a wireless communication with the server apparatus 1 can be easily set in an arbitrary client terminal apparatus 3.

Moreover, the client terminal apparatus 3 can transmit the temporary connection information to the server apparatus 1 via the cable C by the output terminal 32 and the CPU 341 which has executed the wired transmission control program 3442 when the regular connection information is not stored in the regular connection information storage unit 343.

That is, because the client terminal apparatus 3 executes the process for setting the regular connection information only when the regular connection information is not set, the regular connection information is efficiently set.

Further, the temporary connection information is included in the VBI (Vertical Blanking Interval) among the predetermined video information.

Therefore, because the temporary connection information can be included in the predetermined video information which is the existing transmission information, it is highly convenient.

The present invention is not limited to the above described embodiment and can be modified without departing from the gist of the invention.

For example, the client terminal apparatus 3 transmits the temporary connection information to the server apparatus 1 so as to include the temporary connection information in the predetermined video information. However, the temporary connection information may be transmitted to the server apparatus 1 independently.

Moreover, for example, the client terminal apparatus 3 transmits the predetermined video information which includes the temporary connection information to the server apparatus 1 when the regular connection information is not set, and transmits the predetermined video information which does not include the temporary connection information to the server apparatus 1 when the regular connection information is set. However, there is no need for the predetermined video information to be transmitted to the server apparatus 1 when the regular connection information is set.

Further, for example, there is no need for the server apparatus 1 to connect to the output apparatus 2.

The entire disclosures of Japanese Patent Application No. 2006-148470 filed on May 29, 2006 including specification, claims, drawings and abstract thereof are incorporated herein by reference in its entirety.

What is claimed is:

1. A client server system, comprising:
a server apparatus, and
a client terminal apparatus connecting with the server apparatus via a wireless network based on regular connection information, wherein
the client terminal apparatus comprises:
a storage unit to store the regular connection information,
a wired transmission unit to transmit temporary connection information to the server apparatus by a wired transmission at a predetermined timing when the regular connection information is not stored in the storage unit,
a wireless receiving unit to receive the regular connection information which is transmitted from the server apparatus connected with the client terminal apparatus based on the temporary connection information via the wireless network, and
a storage control unit to store the regular connection information which is received by the wireless receiving unit in the storage unit, and
the server apparatus comprises:
a wired receiving unit to receive the temporary connection information which is transmitted by the wired transmission unit, and
a wireless transmission unit to transmit the regular connection information to the client terminal apparatus by which the temporary connection information is transmitted, by using the temporary connection information received by the wired receiving unit via the wireless network.

2. A client server system, comprising:
a server apparatus, and
a client terminal apparatus connecting with the server apparatus via a wireless network based on regular connection information, wherein
the client terminal apparatus comprises:
a storage unit to store the regular connection information,
a wired transmission unit to transmit temporary connection information to the server apparatus by a wired transmission at a predetermined timing,
a wireless receiving unit to receive the regular connection information which is transmitted from the server apparatus connected with the client terminal apparatus based on the temporary connection information via the wireless network, and
a storage control unit to store the regular connection information which is received by the wireless receiving unit in the storage unit, and
the server apparatus comprises:
a wired receiving unit to receive the temporary connection information which is transmitted by the wired transmission unit, and
a wireless transmission unit to transmit the regular connection information to the client terminal apparatus by which the temporary connection information is transmitted, by using the temporary connection information received by the wired receiving unit via the wireless network.

3. The client server system as claimed in claim 2, wherein the wired transmission unit transmits the temporary connection information to the server apparatus by the wired transmission when the regular connection information is not stored in the storage unit.

4. The client server system as claimed in claim 3, wherein the temporary connection information is included in a Vertical Blanking Interval.

5. The client server system as claimed in claim 2, wherein the temporary connection information is included in a Vertical Blanking Interval.

* * * * *